United States Patent
Koehler et al.

(10) Patent No.: US 12,436,052 B2
(45) Date of Patent: Oct. 7, 2025

(54) METHOD FOR FORMING A PATHWAY IN A PRESSURE SENSOR HAVING A GLASS TO METAL SEAL

(71) Applicant: Rosemount Inc., Shakopee, MN (US)

(72) Inventors: Jonathan Gordon Koehler, Chanhassen, MN (US); Eric Paul Petersen, Minnetonka, MN (US)

(73) Assignee: ROSEMOUNT INC., Shakopee, MN (US)

( * ) Notice: Subject to any disclaimer, the term of this patent is extended or adjusted under 35 U.S.C. 154(b) by 426 days.

(21) Appl. No.: 18/153,586

(22) Filed: Jan. 12, 2023

(65) Prior Publication Data
US 2024/0241005 A1    Jul. 18, 2024

(51) Int. Cl.
  *G01L 9/12*   (2006.01)
  *G01L 9/00*   (2006.01)
  *G01L 13/02*  (2006.01)

(52) U.S. Cl.
  CPC .......... *G01L 13/025* (2013.01); *G01L 9/0072* (2013.01)

(58) Field of Classification Search
  CPC ... G01L 13/025; G01L 13/026; G01L 9/0072; G01L 9/0073; G01L 9/0075
  See application file for complete search history.

(56) References Cited

U.S. PATENT DOCUMENTS

| | | | |
|---|---|---|---|
| 1,294,466 A * | 2/1919 | Houskeeper | H01J 5/26 313/247 |
| 4,370,890 A | 2/1983 | Frick | |
| 4,750,926 A * | 6/1988 | Berkey | G02B 6/3803 428/397 |
| 4,915,467 A * | 4/1990 | Berkey | C03B 37/01211 385/96 |

(Continued)

FOREIGN PATENT DOCUMENTS

| | | |
|---|---|---|
| WO | WO 82/01250 | 4/1982 |
| WO | WO 2006/130425 | 12/2006 |

OTHER PUBLICATIONS

Notification of Transmittal of the International Search Report and the Written Opinion of the International Searching Authority from PCT/US2023/033681, dated Feb. 5, 2024.

(Continued)

*Primary Examiner* — Herbert K Roberts
(74) *Attorney, Agent, or Firm* — Westman, Champlin & Koehler, P.A.

(57) ABSTRACT

A method of manufacturing a pressure sensor for sensing a pressure of a process fluid includes obtaining a sensor body having a sensor cavity formed therein. A metal tube is placed through an opening in the sensor body into the sensor cavity. A rod is placed through the metal tube and into the sensor cavity. The sensor cavity is at least partially filled with a dielectric material and the dielectric material completely covers the metal tube carried in the sensor cavity and a portion of the rod. The rod is removed and thereby forming (Continued)

a dielectric passageway which is fluidically coupled to the metal tube. The sensor cavity is sealed with a deflectable diaphragm which is configured to deflect in response to applied pressure from the process fluid. A differential pressure sensor for sensing a differential pressure of a process fluid includes a sensor body having a sensor cavity formed therein is also provided.

11 Claims, 5 Drawing Sheets

(56) References Cited

U.S. PATENT DOCUMENTS

| | | | |
|---|---|---|---|
| 5,477,738 A | 12/1995 | Tobita et al. | |
| 5,905,575 A | 5/1999 | Matsuoka et al. | |
| 6,295,875 B1 | 10/2001 | Frick et al. | |
| 7,308,830 B2 | 12/2007 | Harasyn et al. | |
| 7,334,484 B2 | 2/2008 | Harasyn et al. | |
| 7,412,893 B2 | 8/2008 | Hedtke | |
| 7,415,886 B2 | 8/2008 | Schumacher et al. | |
| 8,234,927 B2 | 8/2012 | Schulte et al. | |
| 8,429,978 B2 | 4/2013 | Klosinski et al. | |
| 9,316,553 B2 | 4/2016 | Willcox | |
| 9,857,259 B2 | 1/2018 | Broden et al. | |
| 2006/0278007 A1 | 12/2006 | Harasyn et al. | |
| 2007/0169557 A1 | 7/2007 | Harasyn et al. | |
| 2010/0083768 A1 | 4/2010 | Hedtke et al. | |
| 2010/0132472 A1 | 6/2010 | Willcox et al. | |
| 2010/0132473 A1 | 6/2010 | Willcox | |
| 2011/0239773 A1 | 10/2011 | Klosinski et al. | |
| 2012/0279580 A1 | 11/2012 | Hausler et al. | |
| 2013/0139565 A1 | 6/2013 | Hedtke | |
| 2016/0091379 A1 | 3/2016 | Broden et al. | |

OTHER PUBLICATIONS

Notice of Allowance and Examiner Initiated Interview Summary from U.S. Appl. No. 14/225,763, dated Jan. 7, 2016.
Notification of Transmittal of the International Search Report and the Written Opinion of the International Searching Authority from PCT/US2015/012393, dated Apr. 28, 2015.
Office Action from U.S. Appl. No. 14/225,763, dated Sep. 1, 2015.

* cited by examiner

METHOD FOR FORMING A PATHWAY IN A PRESSURE SENSOR HAVING A GLASS TO METAL SEAL

BACKGROUND

The present invention relates to pressure sensors of the type used to measure the pressure of a process fluid. More specifically, the present invention relates to providing a pathway through a glass to metal seal in a pressure sensor of the type used to measure pressure of a process fluid.

Transmitters are used in process monitoring and control systems to measure various process variables of industrial processes. One type of transmitter measures pressure of process fluid in the process. Various techniques have been utilized in pressure sensors used in such transmitters. One well known capacitive measuring technique is to use a deflectable diaphragm. A capacitance is measured between two opposing surfaces, with the diaphragm forming one of the capacitive plates of the capacitor and another fixed electrode typically attached to the body of the sensor forming the second capacitor plate. As the diaphragm is deflected due to applied pressure, the measured capacitance changes.

In one such pressure sensor configuration, the sensor body is formed of a metal and filled with a dielectric material such as glass. The dielectric material carries the fixed electrode which provides the second capacitor plate. An open pathway is provided through the sensor body and dielectric material into a cavity formed within the sensor body which carries the diaphragm. A metal tube carries a pressure to the open pathway. A seal must be provided between the metal tube and the dielectric material.

SUMMARY

A method of manufacturing a pressure sensor for sensing a pressure of a process fluid includes obtaining a sensor body having a sensor cavity formed therein. A metal tube is placed through an opening in the sensor body into the sensor cavity. A rod is placed through the metal tube and into the sensor cavity. The sensor cavity is at least partially filled with a dielectric material and the dielectric material completely covers the metal tube carried in the sensor cavity and a portion of the rod. The rod is removed and thereby forming a dielectric passageway which is fluidically coupled to the metal tube. The sensor cavity is sealed with a deflectable diaphragm which is configured to deflect in response to applied pressure from the process fluid A differential pressure sensor for sensing a differential pressure of a process fluid includes a sensor body having a sensor cavity formed therein. A diaphragm in the sensor cavity is configured to deflect in response to an applied differential pressure. A dielectric material is deposited on the sensor body in the sensor cavity and a capacitive plate is carried on the dielectric material and forms a sense capacitor with the deflectable diaphragm having a capacitance related to the applied differential pressure. This capacitance changes in response to deflection of the deflectable diaphragm. A metal tube couples to a process pressure and has a distal end which extends from an exterior of the sensor body into the sensor cavity to a proximal end located within the dielectric material. An opening in the dielectric material fluidically couples the distal end of the metal tube to the diaphragm cavity through a dielectric passageway which carries a fill fluid which is in contact with the dielectric passageway. In a method, the dielectric passageway is formed using an elongate rod.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

DETAILED DESCRIPTION OF ILLUSTRATIVE EMBODIMENTS

Figure 1:
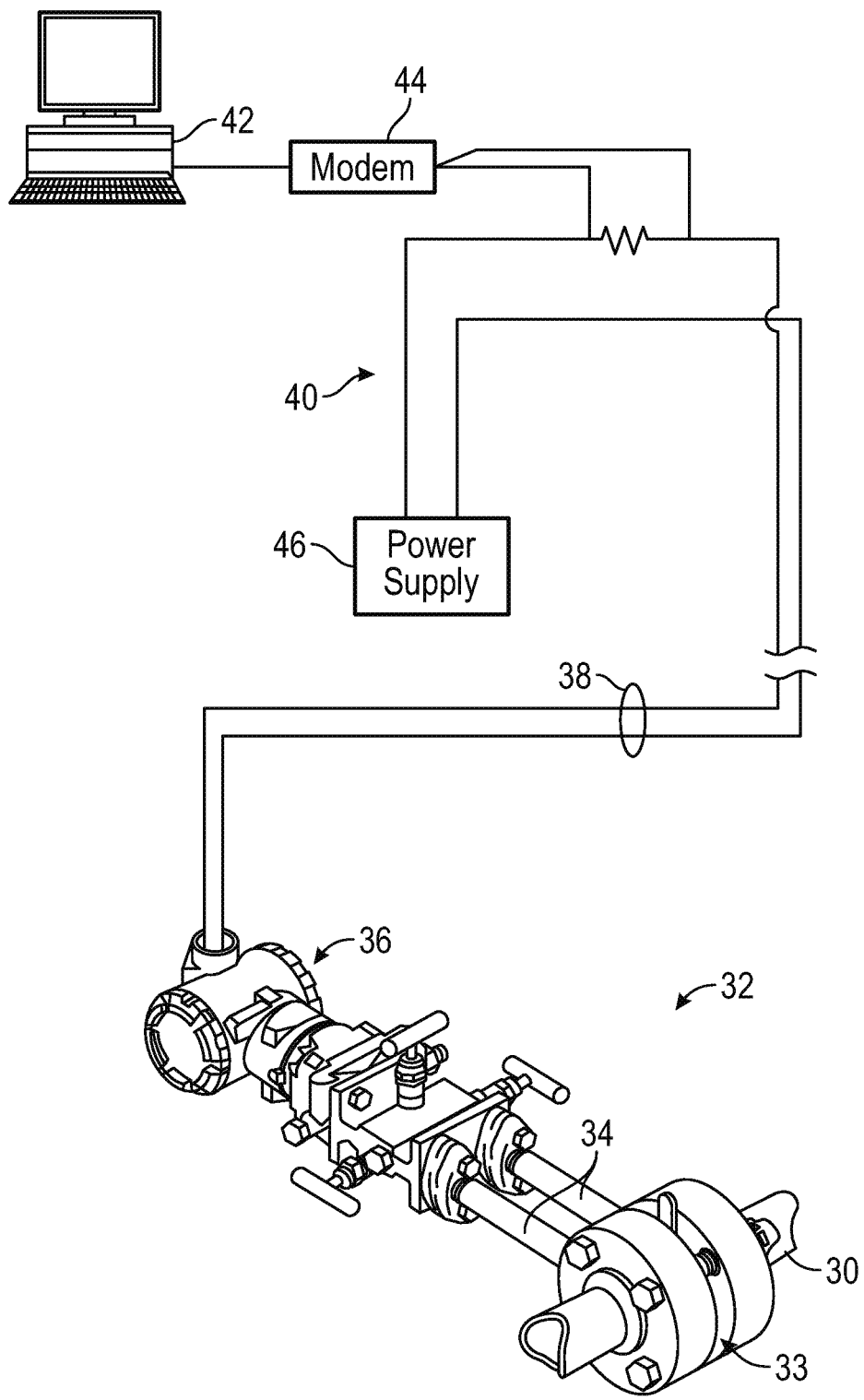
FIG. 1 shows a process measurement system with a process transmitter constructed in accordance with the present invention.

Embodiments of the present disclosure are described more fully hereinafter with reference to the accompanying drawings. Elements that are identified using the same or similar reference characters refer to the same or similar elements. Some elements may not be shown in each of the figures in order to simplify the illustrations. The various embodiments of the present disclosure may be embodied in many different forms and should not be construed as limited to the specific embodiments set forth herein. Rather, these embodiments are provided so that this disclosure will be thorough and complete, and will fully convey the scope of the present disclosure to those skilled in the art.

As discussed in the Background section, one technique for measuring a differential pressure is to measure deflection of a diaphragm based upon a change in capacitance. The diaphragm is carried in a pressure sensor body. Further, the metal tube must be electrically insulated from contact with a capacitive plate of the pressure sensor. Thermal mismatch issues can be particularly problematic when implementing a lead-free glass configuration for the pressure sensor. The present invention includes a method of providing an open pathway through a glass to metal seal of a pressure sensor.

FIG. 1 shows generally the environment of an industrial process measurement system 32. FIG. 1 shows process piping 30 containing a process fluid under pressure which is coupled to the process measurement system 32 for measuring a process pressure. The process measurement system 32 includes impulse piping 34 connected to the process piping 30. The impulse piping 34 is connected to a process pressure transmitter 36. A primary element 33, such as an orifice plate, venturi tube, flow nozzle, and so on, contacts the process fluid at a location in the process piping 30 between the pipes of the impulse piping 34. The primary element 33 causes a pressure change in the fluid as it flows past the primary element 33 This pressure differential can be related to fluid flow.

Transmitter 36 is a process measurement device that receives process pressures through the impulse piping 34. The transmitter 36 senses a differential process pressure and converts it to a standardized transmission signal that is a function of the process pressure.

A process control loop 38 provides both a power signal to the transmitter 36 from control room 40 and bidirectional communication, and can be constructed in accordance with a number of process communication protocols. In the illustrated example, the process loop 38 is a two-wire loop. The two-wire loop is used to transmit all power and communications to and from the transmitter 36 during normal operations with a 4-20 mA signal. A computer 42 or other information handling system through network interface 44 is used for communication with the transmitter 36. A remote voltage power supply 46 powers the transmitter 36. In addition to the loop configuration discussed above, process control loop 38 can also comprise any appropriate process control loop. Examples include the HART® communication protocol in which digital information is modulated on to a 4-20 mA current, the Foundation Fieldbus or Profibus communication protocols, etc. Process control loop 38 may also be implemented using wireless communication techniques. One example of wireless communication technique is the WirelessHART® communication protocol in accordance with IEC 62591. Other techniques may also be used, including those implemented using Ethernet or optical fiber.

Figure 2:
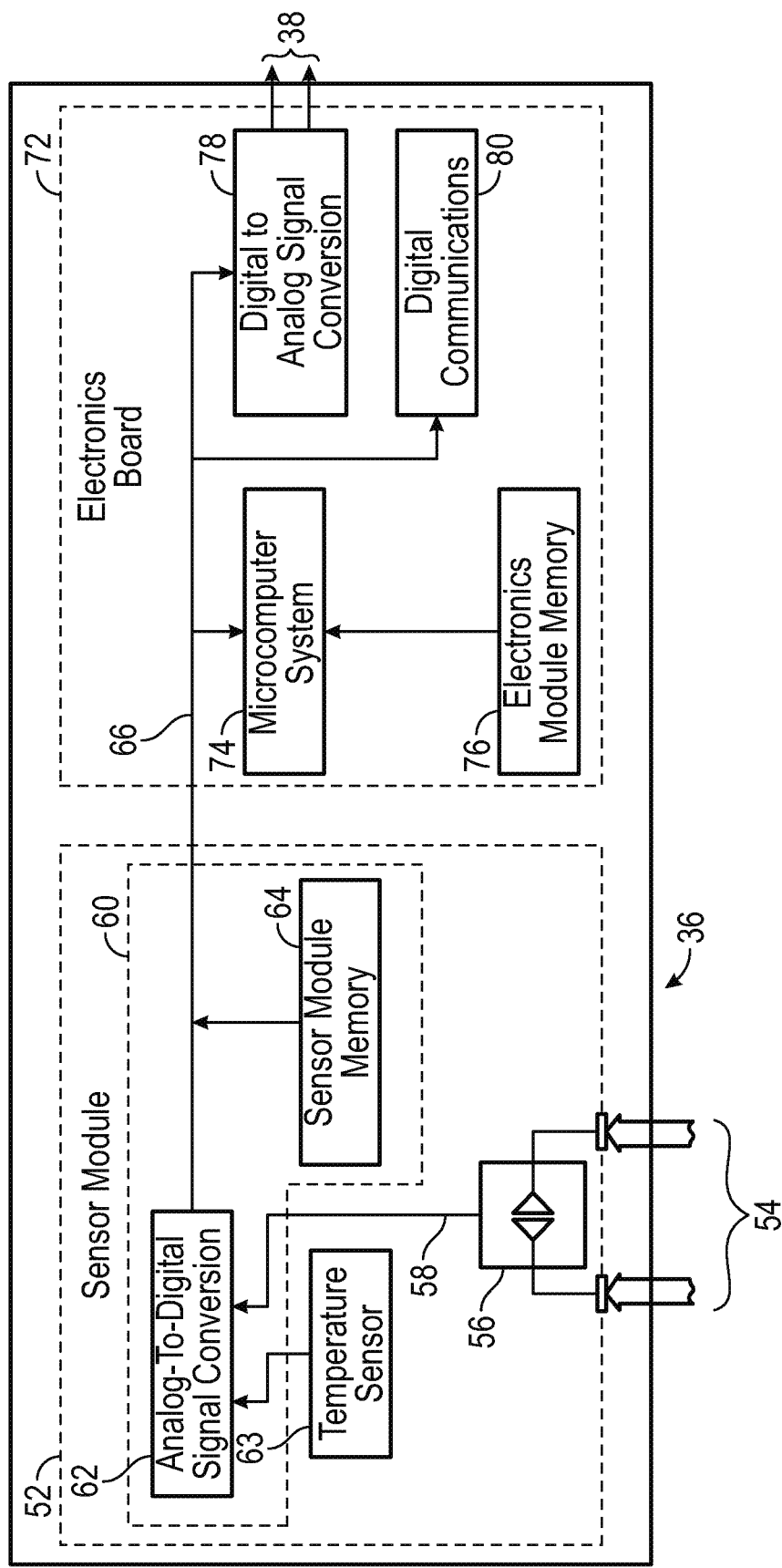
FIG. 2 is a schematic view of a transmitter of FIG. 1.

FIG. 2 is a simplified block diagram of pressure transmitter 36. Pressure transmitter 36 includes a sensor module 52 and an electronics board 72 coupled together through a databus 66. Sensor module electronics 60 couples to pressure sensor 56 which received an applied differential pressure 54. The data connection 58 couples sensor 56 to an analog to digital converter 62. An optional temperature sensor 63 is also illustrated, along with sensor module memory 64. The electronics board 72 includes a microcomputer system 74, electronics memory module 76, digital to analog signal conversion 78 and digital communication block 80. In accordance with techniques set forth in, for example, U.S. Pat. No. 6,295,875 to Frick et al., pressure transmitter 36 measures differential pressure. However, the present invention is not limited to such a configuration.

Figure 3:
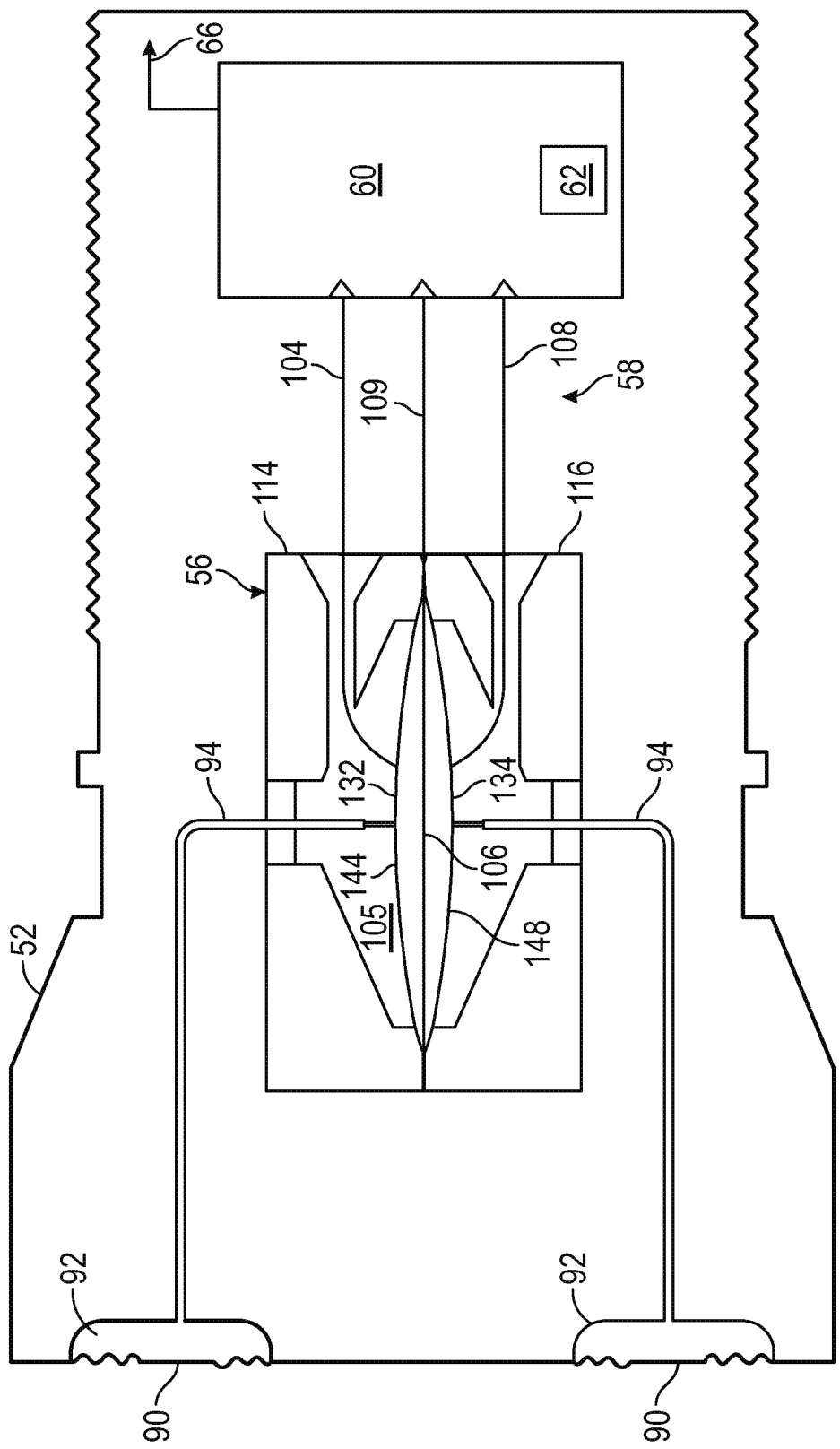
FIG. 3 shows a cross-sectional view of a portion of the process transmitter of FIG. 1.

FIG. 3 is a simplified cross-sectional view of one embodiment of a pressure sensor module 52 showing pressure sensor 56. Pressure sensor 56 couples to a process fluid through isolation diaphragms 90 which isolate the process fluid from cavities 92. Cavities 92 couple to the pressure sensor module 56 through metal tubing 94. A substantially incompressible fill fluid fills cavities 92 and tubing 94. When a pressure from the process fluid is applied to diaphragms 90, it is transferred to the pressure sensor 56 by the fill fluid through the tubing 94.

Pressure sensor 56 is formed from two pressure sensor half cells 114 and 116 and filled with a substantially incompressible and electrically insulating dielectric (ceramic) material 105 such as glass. The two sensor halves 114 and 116 form a sensor body. A diaphragm 106 is suspended within a diaphragm cavity 132,134 formed within the pressure sensor 56. An outer wall of the cavity 132, 134 carries electrodes 144 and 148 on glass 105.

As illustrated in FIG. 3, the various electrodes in sensor 56 are coupled to analog to digital converter 62 over electrical connections 104,108. Additionally, the deflectable diaphragm 106 couples to analog to digital converter 62 through connection 109. As discussed in U.S. Pat. No. 6,295,875, the differential pressure applied to the sensor 56 can be measured using the electrodes 144, 148, 106. As used herein, a "sensor body" is formed by sensor halves 114, 116. A "diaphragm cavity" is formed by regions 132 and 134. The "sensor cavity" is partially filled with glass 105 and includes the diaphragm cavity.

In a typical configuration, tubing 94 comprising a metal such as stainless steel and dielectric material 105 comprises a glass. The process pressure applied to the interior cavities 132, 134 of pressure sensor 56 must be sealed from the exterior environment. It is often difficult to provide a seal between a glass and a metal and also electrically insulate metal tubing 94 from electrodes 144,148.

Figure 4:
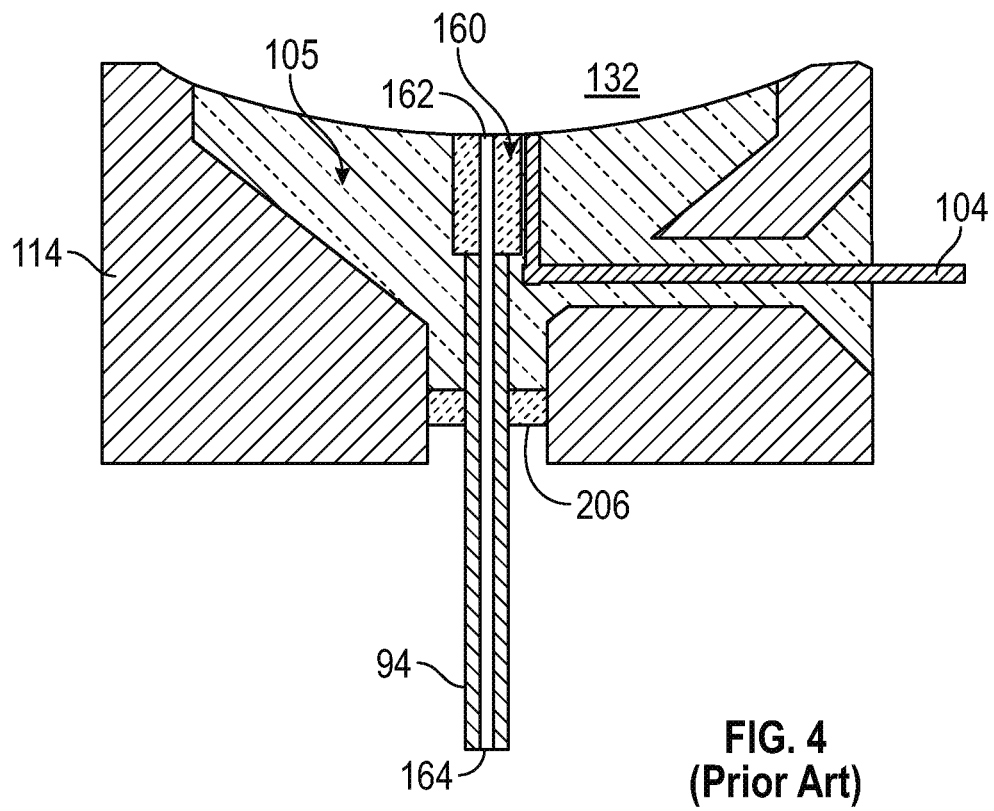
FIG. 4 is a cross-sectional view of a half cell of a prior art configuration of a pressure sensor.

FIG. 4 is a cross-sectional diagram of a prior art configuration of sensor half cell 114. Sensor half 114 receives a pressure through tubing 94 related to an applied process pressure. The metal tubing 94 extends into the glass 105. Thus, tubing 94 must be sealed against the glass 105. Glass to metal seals require that the materials of the assembly have thermal properties which are selected to avoid cracking of the glass due to differences in their thermal expansion. During manufacture, temperature changes occur during the glass slumping process in which the heated glass fills the cavity and is formed into a desired shape and maintained in the cavity by sleeve insert 206. A ceramic insert 160 is placed on top of the metal tube 94 in the glass 105 and has a passageway 162 aligned with a passageway 164 of the tube 94. The ceramic insert 160 is ground away during the manufacturing process to reveal the passageway 162. The ceramic insert 160 may have a thermal mismatch with the glass 105 which can cause cracks in material 105 at their interface. Further, the metal tubing 94 is typically connected to electrical ground and cannot extend completely into cavity 132 and contact plate 144 because there must be electrical isolation between the metal tube 94 and the capacitor plate 144 (shown in FIG. 3).

Figure 5:
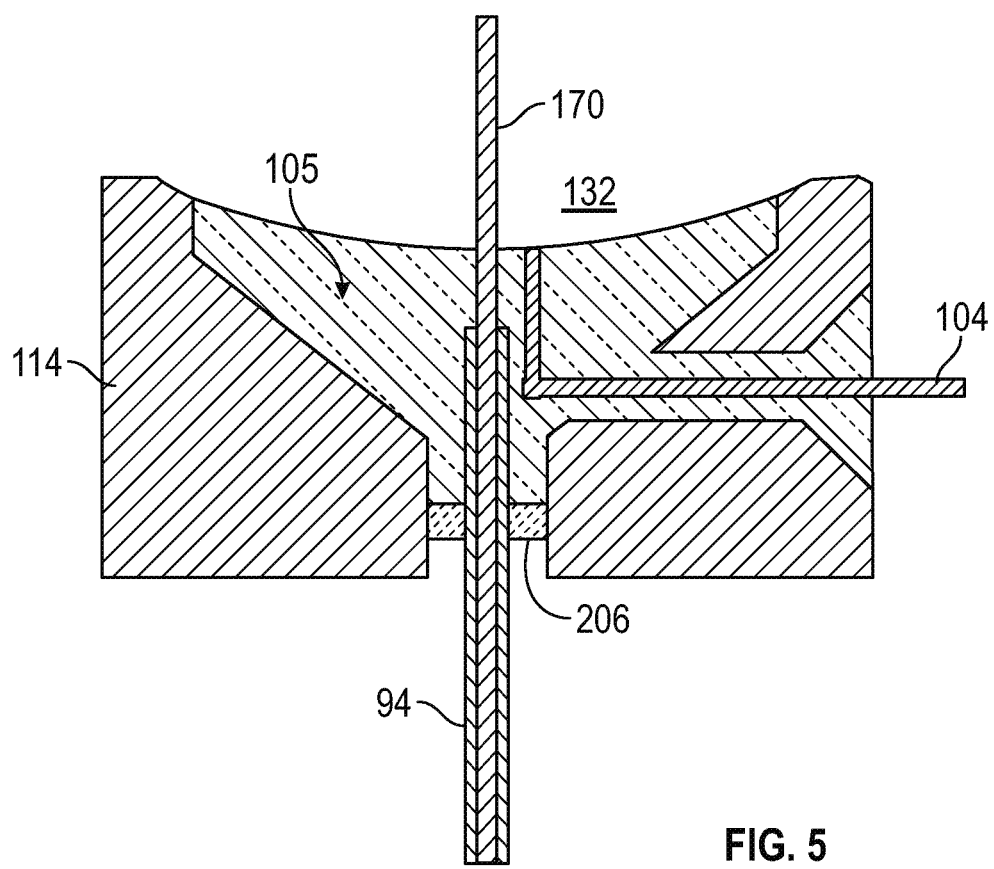
FIG. 5 is a cross-sectional view of a half cell of a configuration of a pressure sensor during fabrication in accordance with one example embodiment method of the present invention.

FIG. 5 shows a configuration of the pressure sensor assembly 56 during manufacture in accordance with one example embodiment of the present invention. Similar elements in FIG. 5 have retained their numbering. In FIG. 5, the ceramic insert 160 of FIG. 4 is not used. During manufacture, an elongate rod 170 extends through metal tube 94 and through the glass 105. In one configuration, rod 170 comprises a graphite rod. A sleeve 206 seals the lower portion of the sensor cavity. The glass 105 is heated and is shaped in accordance with known glass slumping processes. The material 105 may be shaped using other processes. Once formation of the glass 105 is complete, the graphite rod 170 is removed, for example using a drilling process. Other material removal processes may also be employed.

Figure 6:
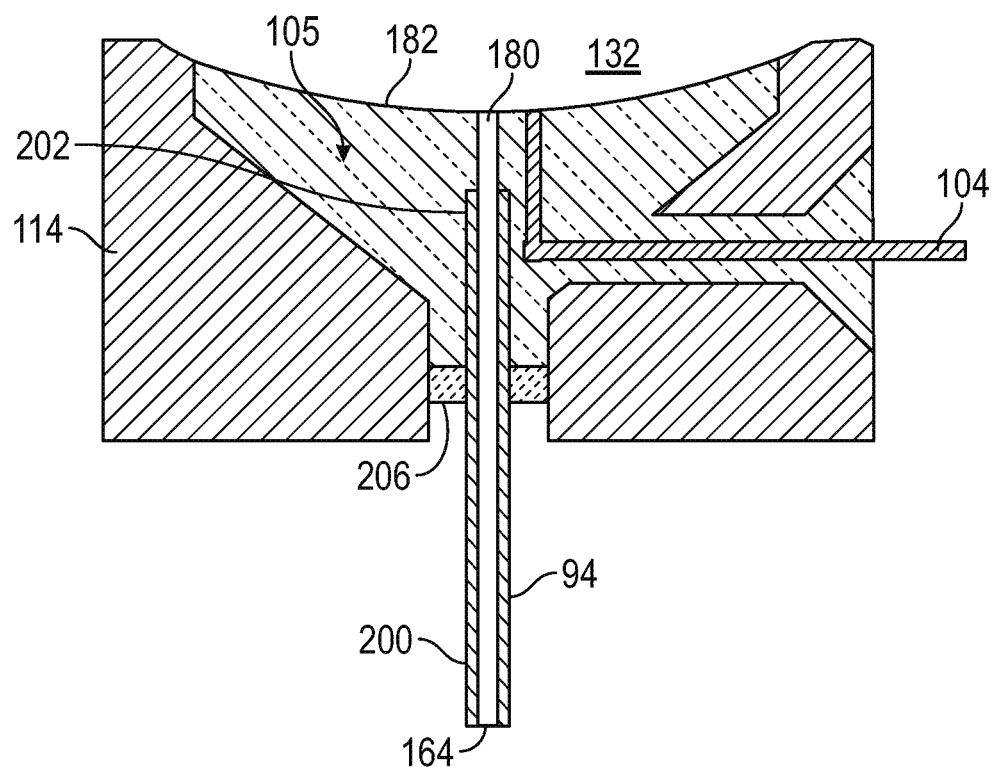
FIG. 6 is a cross-sectional view of the half cell of the pressure sensor of FIG. 5 following removal of a rod used during the manufacturing process.

As illustrated in FIG. 6, once the graphite rod 170 is removed, the passageway 164 of metal tube 94 is aligned with a dielectric (glass) passageway 180 which extends through ceramic 105. Thus, the metal tube 94 has a distal end 200 which extends from an exterior of the sensor body 56 and a proximal end 202 located within the glass 105 and spaced apart from an interior surface 182 of the glass 105. The glass passageway 180 provides an open passageway from the interior cavity 132 which extends through the glass 105 and couples with the passageway 164. The passageway is filled with a fill fluid which contacts the glass 105 along the glass passageway 180. The metal tubing 94 is spaced apart from the surface 182 of the glass 105 and thereby electrically insulated from the capacitor plate 144 (shown in FIG. 3). FIGS. 5 and 6 show a configuration of a single sensor half cell 114. However, sensor half cell 116 is fabricated in a similar manner and joined with sensor half cell 114 as illustrated in FIG. 3. Residual graphite which remains after the removal process can be cleaned using a pressure wash and precision cleaning.

In one specific configuration, ceramic material 105 comprises glass. In another specific configuration, graphite rod 170 comprises a pencil lead or the like. The glass passageway 180 forms a tube which carries the fill fluid. The fill fluid contacts the walls of the passageway 180. The metal tube 94 is spaced apart from the interior cavity 132 by the glass 105.

Although the present invention has been described with reference to preferred embodiments, workers skilled in the art will recognize that changes may be made in form and detail without departing from the spirit and scope of the invention. Although a graphite rod 170 is described, any appropriate material may be used for rod 170. For example, an insulating rod may be employed. In one configuration, the rod 170 can be removed using a chemical reaction in which a chemical is applied to dissolve the rod 170. As discussed above, in a method of manufacturing the pressure sensor 56, a sensor half cell 114 is filled with a liquid glass material 105. During this filling process, metal tubing 94 is positioned from an exterior of the sensor half cell 114 and into the glass 105. A graphite rod 170 is placed through a hole in the tube 94 and extends beyond a top surface 182 of the glass 105. A sleeve insert 206 is positioned to maintain the glass 105 in the half cell 114. An electrode 104 is positioned such that it is extends through the glass 105 and to the surface 182. Once the glass 105 solidifies, the graphite rod 170 is removed. This may be through any appropriate material removal process such as drilling through the graphite rod 170. In another configuration, a chemical etch is used to remove the material of rod 170. Further, the surface 182 can be shaped as desired using machining techniques. After the surface 182 is shaped as desired, electrodes 144,148 can be deposited and electrically coupled to electrodes 104,106. A similar process is used for fabrication of sensor half cell 116 and the two half cells 114,116 are joined to create a sensor assembly 56 as shown in FIG. 3.

What is claimed is:

1. A method of manufacturing a pressure sensor for sensing a pressure of a process fluid, comprising:
   obtaining a sensor body having a sensor cavity formed therein;
   placing a metal tube through an opening in the sensor body into the sensor cavity;
   placing a rod through the metal tube and into the sensor cavity;
   at least partially filling the sensor cavity with a dielectric material, wherein the dielectric material completely covers the metal tube carried in the sensor cavity and a portion of the rod;
   removing the rod and forming a dielectric passageway fluidically coupled to the metal tube; and
   sealing the sensor cavity with a deflectable diaphragm configured to deflect in response to applied pressure from the process fluid.

2. The method of claim 1 wherein the rod comprises a graphite rod.

3. The method of claim 1 wherein removing the rod comprises drilling the rod.

4. The method of claim 1 including shaping the dielectric material into a desired shape in the sensor cavity.

5. The method of claim 1 including depositing a capacitive plate on the dielectric material in the sensor cavity to form a sense capacitor with the deflectable diaphragm.

6. The method of claim 5 measuring a capacitance of the sensed capacitor.

7. The method of claim 5 wherein the capacitive plate is insulated from the metal tube by the dielectric material.

8. The method of claim 1 wherein the dielectric material comprises glass.

9. The method of claim 8 including forming the glass using a glass slumping process.

10. The method of claim 1 including filling a metal tube and the dielectric passageway with a fill fluid.

11. The method of claim 10 wherein the fill fluid contacts dielectric passageway.

* * * * *